H. S. HATFIELD.
ELECTROLYTIC MEASURING INSTRUMENT.
APPLICATION FILED JUNE 22, 1914.
1,173,570.
Patented Feb. 29, 1916.
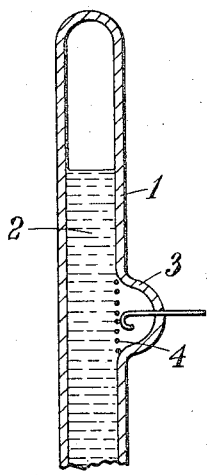

UNITED STATES PATENT OFFICE.

HENRY STAFFORD HATFIELD, OF BRUNSWICK, GERMANY.

ELECTROLYTIC MEASURING INSTRUMENT.

1,173,570. Specification of Letters Patent. Patented Feb. 29, 1916.

Application filed June 22, 1914. Serial No. 846,545.

*To all whom it may concern:*

Be it known that I, HENRY STAFFORD HATFIELD, of Herzogin-Elizabeth strasse 23, Brunswick, Germany, have invented certain new and useful Improvements in or Connected with Electrolytic Measuring Instruments, of which the following is a specification.

My invention relates to electrodes for electrolytic measuring instruments of that type which have solid electrodes at which a gas is absorbed or liberated from a liquid electrolyte. In such instruments it has been proposed to employ electrodes of platinized platinum that is, platinum coated with platinum black. There is a disadvantage however in the employment of platinized platinum for the electrodes in the case of shunted cells for as I have discovered the current through the cell is not always proportional to the main current but is too small in proportion at low loads.

Now it has been discovered by me, that by the employment of rhodium or suitable metal coated with rhodium for the electrode at which the gas is liberated this drawback is overcome and the current through the cell is, for practical purposes, proportional to the main current at all loads.

I may employ rhodium for the electrode in any convenient way. Thus for example it may be deposited upon gold or upon an alloy of gold with ten per cent. platinum, and the deposit may be from gray to black, according to the current used in deposition. When, then, I speak of a rhodium electrode, I do not mean one the whole mass or volume of which is composed of rhodium so long as the coating is of rhodium. And when I speak of a base of gold upon which the rhodium is deposited, I do not mean to limit myself to pure gold but include any proper alloy of gold.

I contemplate the employment of the present invention especially in the case of electrolytic meters of the kind described in the specification accompanying my application for patent in the United States, filed 28th June, 1913, Serial No. 776,235, now Patent No. 1,111,898, in which it is peculiarly useful.

I have therefore, in the drawing, shown one form of the electrolytic meter of my prior patent just referred to, and the drawing shows one form of electrolytic meter in which my rhodium electrode may be used with peculiar utility.

In the drawing, 1 represents the measuring tube of the meter, and 2 the electrolyte therein. 3 is a thimble of glass formed upon the inside of the measuring tube across the mouth of which is placed an electrode 4 formed of rhodium in the shape of a gauze or of a grill or a perforated plate or foil, the interstices being of such small size that the surface tension of the electrolyte prevents it from penetrating therethrough. The anode I may make of platinum. It will be seen that the electrode, in this case the cathode, lies in a line of contact between the electrolyte and a body of evolved gas and that the liberated gas diffuses at once into the body of the gas and as the volume of the latter increases, a portion is from time to time forced out of the largest hole in the gauze and escapes as a bubble to the gas at the top of the measuring tube.

In electrodes so employed I have discovered that no part of the electrode must be more than an extremely short distance from the gas reservoir, this distance being known as the radius of capillary action. I have found, with an electrode so situated, that when the current density applied is not too high, the gas, instead of appearing as a bubble, goes momentarily into a slightly supersaturated solution in the immediate proximity of the electrode and thereupon quickly diffuses over into the gas space because the latter is so near. In this way two advantages are gained. No gas gets away from the electrode into the body of the electrolyte as a supersaturated solution and is thus lost to registration. Again the electrode is not polarized as in the case when gas bubbles are actually formed. It is therefore the essence of this part of my invention that no part of the active electrode shall be more than a very short distance, say the fraction of a millimeter, from the gas space so as to permit the gas which appears at the electrode to escape directly into the gas space instead of forming bubbles and possibly escaping into the body of the electrolyte and being lost for the purpose in hand. I therefore form my electrode, or rather the active part of it, in this form of my invention in the shape of a line which is situated at the boundary between the liquid and the gas space and which never extends into the liquid for more than a very short distance, say the fraction of a millimeter. It must be understood however that although I have, in order to fix ideas, described my rhodium cathode in the above more specific description of my invention in connection with an electrolytic measuring instrument of the type shown in my prior Patent No. 1,111,898, for the reason that it is peculiarly useful there, I do not desire to limit my invention to this specific application. The fact is that my discovery that the use of rhodium as an electrode in an electrolytic meter and more especially as a cathode, has a wider range, for the reason that, as I have pointed out at the beginning, the current through a cell employing a rhodium electrode is for practical purposes proportional to the main current at all loads and does not vary with the load as is the case with platinized platinum for instance.

What I claim as my invention and desire to secure by Letters Patent is:—

1. An electrolytic measuring instrument having a liquid electrolyte and a rhodium electrode substantially as described.

2. An electrolytic measuring instrument having a liquid electrolyte and a rhodium cathode at which gas is liberated substantially as described.

3. An electrolytic measuring instrument having a liquid electrolyte and an electrode of rhodium on a gold base substantially as described.

4. An electrolytic measuring instrument having a liquid electrolyte and a rhodium electrode whose active part is line shape and is situated on the boundary between the liquid and the gas space substantially as described.

In witness whereof I have signed my name to this specification in the presence of two subscribing witnesses.

HENRY STAFFORD HATFIELD.

Witnesses:
B. HOGARTH,
H. PETERSEN.